(12) United States Patent
Tsai et al.

(10) Patent No.: US 12,246,832 B2
(45) Date of Patent: Mar. 11, 2025

(54) AIRCRAFT ASSEMBLIES WITH SEALING STRUCTURES

(71) Applicant: The Boeing Company, Arlington, VA (US)

(72) Inventors: Kevin R. Tsai, Redmond, WA (US); Ramón A. Burin, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 99 days.

(21) Appl. No.: 18/193,518

(22) Filed: Mar. 30, 2023

(65) Prior Publication Data

US 2024/0326982 A1   Oct. 3, 2024

(51) Int. Cl.
  *B64C 9/02*   (2006.01)
  *B64F 5/10*   (2017.01)
  *F16F 1/02*   (2006.01)

(52) U.S. Cl.
  CPC .................. *B64C 9/02* (2013.01); *B64F 5/10* (2017.01); *F16F 1/027* (2013.01)

(58) Field of Classification Search
  CPC .... B64C 7/00; B64C 9/02; B64C 9/22; B64C 9/24; B64C 9/26
  See application file for complete search history.

(56) References Cited

U.S. PATENT DOCUMENTS

| | | | | |
|---|---|---|---|---|
| 5,323,965 A * | 6/1994 | Froemming | .............. | B64C 7/00 239/265.37 |
| 6,394,397 B1 * | 5/2002 | Ngo | ..................... | B64C 23/072 244/203 |
| 7,753,316 B2 * | 7/2010 | Larssen | ................... | B64C 23/06 244/199.4 |
| 8,096,500 B2 * | 1/2012 | Burgos Gallego | ........ | B64C 9/02 244/89 |
| 9,255,642 B2 * | 2/2016 | Bidkar | ..................... | F01D 11/04 |
| 9,457,894 B2 * | 10/2016 | Bonatto | .................. | B64C 23/00 |
| 9,509,204 B2 * | 11/2016 | Hull | ......................... | B64C 9/02 |
| 9,567,064 B2 * | 2/2017 | Schlipf | ..................... | B64C 9/14 |
| 9,637,219 B2 | 5/2017 | Timm et al. | | |
| 10,800,511 B2 * | 10/2020 | Dickey | ..................... | F16B 1/02 |
| 10,870,480 B2 | 12/2020 | Brakes | | |
| 11,192,625 B2 * | 12/2021 | Poloni | ...................... | B64C 3/26 |
| 11,192,632 B2 | 12/2021 | Dovey | | |
| 11,209,084 B2 * | 12/2021 | Dovey | ................... | B22F 5/106 |

FOREIGN PATENT DOCUMENTS

CN   113883272 A   1/2022

OTHER PUBLICATIONS

English language machine translation of CN113883272A, downloaded from Google Patents Mar. 30, 2023.

* cited by examiner

*Primary Examiner* — Joshua J Michener
*Assistant Examiner* — Michael B. Kreiner
(74) *Attorney, Agent, or Firm* — Kolitch Romano Dascenzo Gates LLC (57) ABSTRACT

Aircraft assemblies comprise an aerostructure, a sealing structure, and a flexure spring. The aerostructure comprises an end surface. The flexure spring is operably coupled between the aerostructure and the sealing structure and is configured to urge the sealing structure away from the end surface of the aerostructure. The flexure spring has a neutral configuration and a range of deflected configurations. The flexure spring is biased toward the neutral configuration.

20 Claims, 8 Drawing Sheets

AIRCRAFT ASSEMBLIES WITH SEALING STRUCTURES

FIELD

The present disclosure relates to aircraft assemblies with sealing structures.

BACKGROUND

Actuation of flight control surfaces of an aircraft changes one or more aerodynamic characteristics of the aircraft in a desired manner. In some aircraft, two adjacent flight control surfaces are configured to be deployed in tandem (i.e., at the same time). In some examples, it may be important for the respective aerosurfaces (i.e., the surfaces along which the air flows to create lift) of the adjacent flight control surfaces to be fairly uniform in contour in all positions of deployment, such as in the flight control surfaces' retracted configurations, in their extended configurations, and in all positions between the two. More specifically, gaps between the adjacent aerosurfaces and/or misalignment of the aerosurfaces may produce undesirable aerodynamic effects on the aircraft. Accordingly, there is a need to minimize or eliminate such gaps and to maintain a smooth transition between adjacent aerosurfaces.

SUMMARY

Aircraft assemblies comprise an aerostructure, a sealing structure, and a flexure spring. The aerostructure comprises an end surface. The flexure spring is operably coupled between the aerostructure and the sealing structure and is configured to urge the sealing structure away from the end surface of the aerostructure. The flexure spring has a neutral configuration and a range of deflected configurations. The flexure spring is biased toward the neutral configuration.

Aircraft assembly kits comprise a sealing structure, and a flexure spring. The flexure spring is configured to be operably coupled between an aerostructure and the sealing structure to urge the sealing structure away from the aerostructure.

DESCRIPTION

Figure 1:
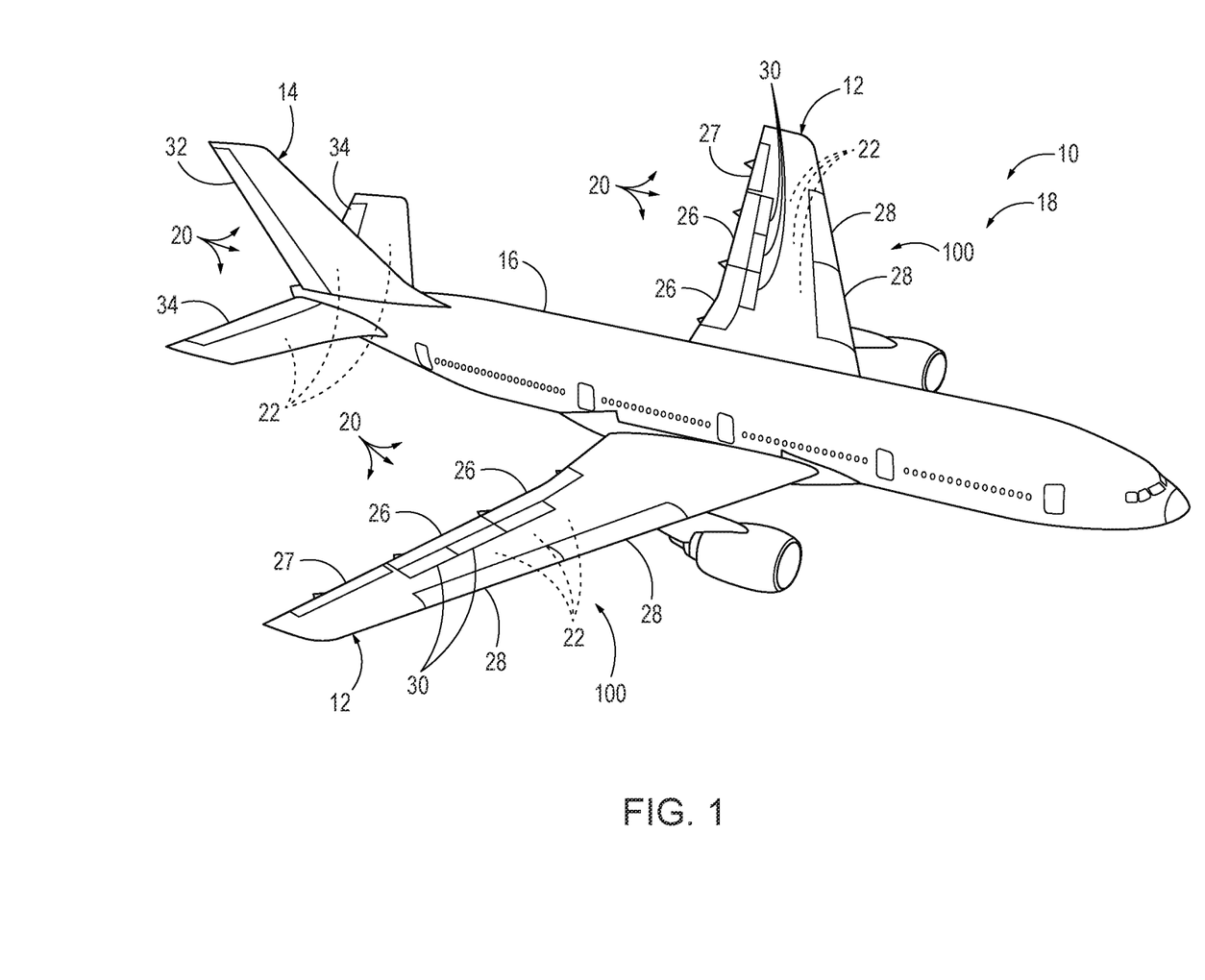
FIG. 1 is an illustration of an example aircraft.
Figure 2:
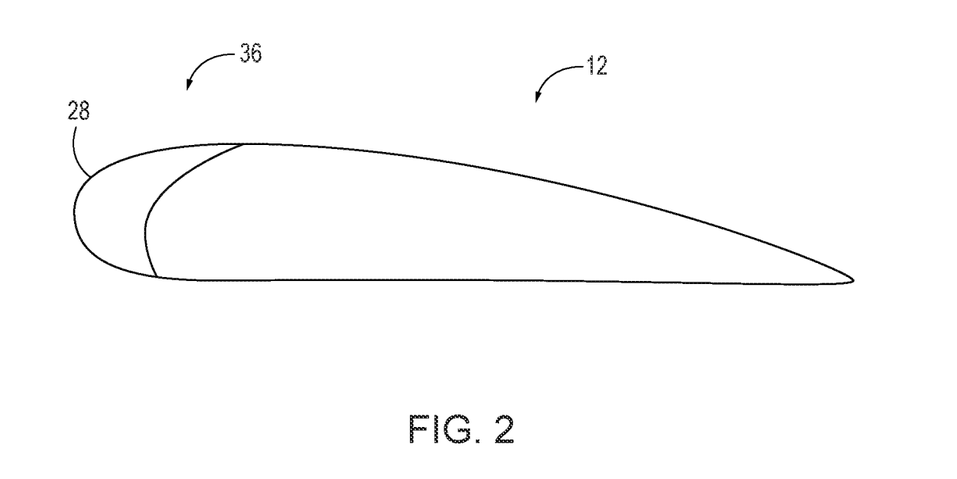
FIG. 2 is a schematic illustration of a wing with a slat in a retracted configuration.
Figure 3:
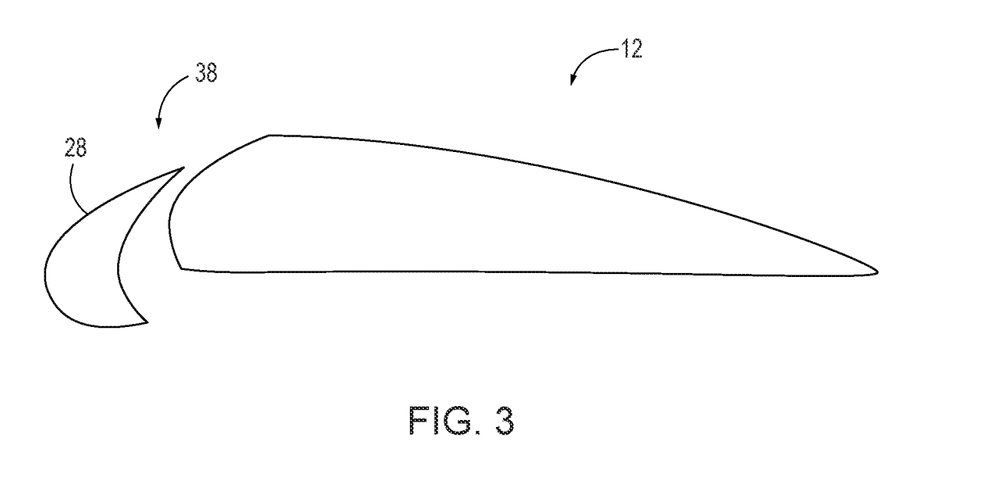
FIG. 3 is a schematic illustration of a win with a slap in an extended configuration.

FIG. 1 is a schematic representation of an aircraft 10 that may comprise aircraft assemblies 100 according to the present disclosure. While aircraft 10 is depicted as a fixed-wing airliner, aircraft 10 and aircraft assemblies 100 according to the present disclosure are not limited to such examples, and aircraft 10 may be fixed wing aircraft, commercial aircraft, military aircraft, passenger aircraft, autonomous aircraft, rotorcraft, etc. Aircraft 10 typically include wings 12 and a tail 14 that are supported by a fuselage 16 to form and/or define an airframe 18. The wings 12 and the tail 14 typically include a plurality of flight control surfaces 20 that are configured to be selectively moved relative to support structures 22 of the wings 12 or the tail 14. Examples of flight control surfaces 20 include flaps 26, ailerons 27, slats 28, spoilers 30, rudders 32, and elevators 34. Some flight control surfaces 20 may be described as being configured to be actuated between a retracted configuration 36, as illustrated in FIG. 2, and an extended configuration 38, as illustrated in FIG. 3, using a slat 28 as an example. A retracted configuration 36 also may be described as a stowed configuration or a nominal configuration, and an extended configuration 38 also may be described as a deployed configuration or an actuated configuration.

Figure 4:
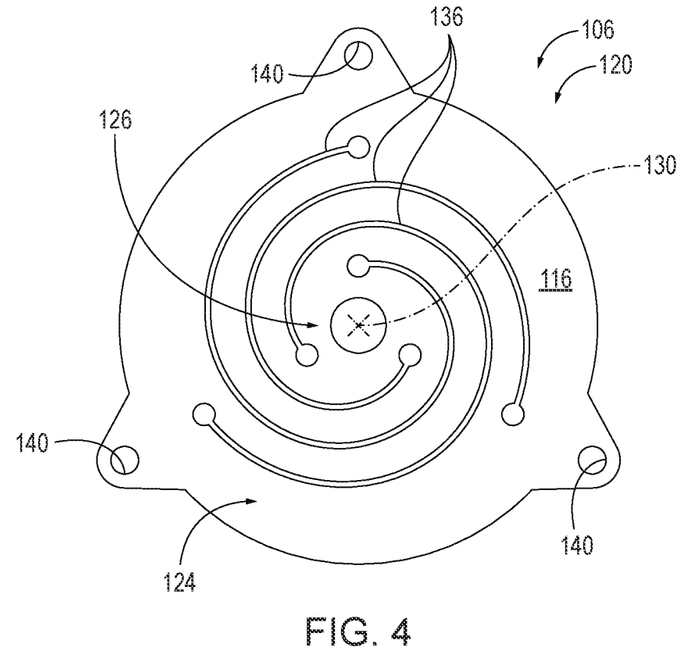
FIG. 4 is a schematic top view representation of an example flexure spring in a neutral configuration.
Figure 5:
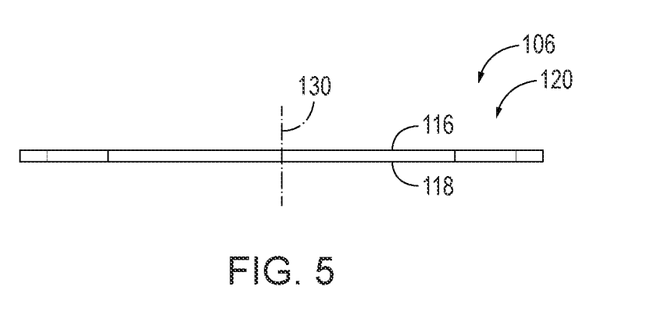
FIG. 5 is a schematic side view representation of the example flexure spring of FIG. 4 in a neutral configuration.
Figure 6:
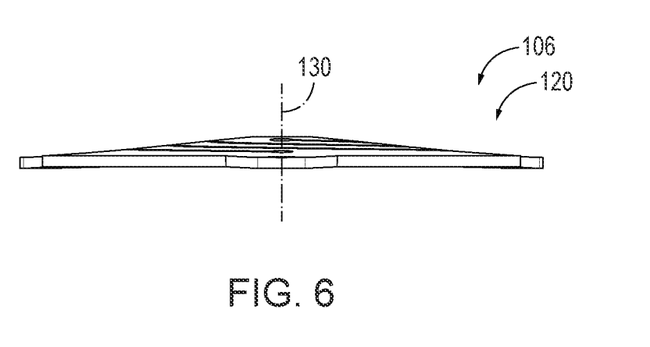
FIG. 6 is a schematic side view representation of the example flexure spring of FIG. 4 in a first deflected configuration.
Figure 7:
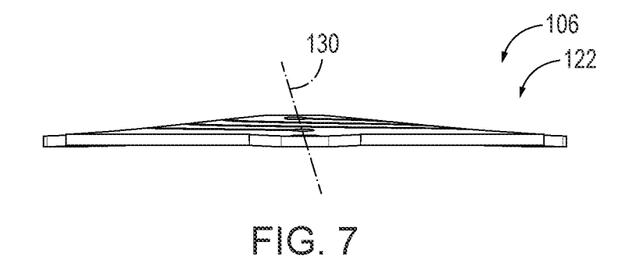
FIG. 7 is a schematic side view representation of the example flexure spring of FIG. 4 in a second deflected configuration.

Aircraft assemblies 100 according to the present disclosure comprise at least one flexure spring 106. Flexure springs 106 also may be referred to as flexure bearings. With reference to FIGS. 4-7, an example flexure spring 106 is depicted. Flexure springs 106 are a unique type of spring generally constructed from a flat piece of resilient material, such as a metal. However, flexure springs 106 also may be constructed of plastics, fiber reinforced plastics, and other resilient materials. Flexure springs 106 may be circular or generally circular, but are not required to be. With reference to FIG. 4, flexure springs 106 typically are configured to be mounted between two structures, with a first structure mounted to a perimeter region 124 of the flexure spring 106, and with a second structure mounted to a central region 126 on the opposite side of the flexure spring 106. That is, flexure springs 106 may be described as having a first side 116 and a second side 118 that is opposite the first side 116. As a result, the flexure spring 106 provides multiple degrees of freedom with respect to the two structures mounted to the opposite sides of the flexure spring 106. In particular, a flexure spring 106 may be described as having a neutral configuration 120 corresponding to an undeformed state, such as illustrated in FIGS. 4 and 5, and also as having a range of deflected configurations 122, in which the perimeter region 124 and the central region 126 have been moved relative to each other as a result of a load applied to one of the perimeter region 124 or the central region 126 and the flexure spring 106 is in a state of deformation, such as illustrated in FIGS. 6 and 7. When the load is removed, the flexure spring 106 returns to its neutral configuration. That is, flexure springs 106 are biased toward their neutral configurations 120. The neutral configuration 120 of a flexure spring 106 also may be described as an unsprung or unloaded configuration, and the deflected configurations 122 of a flexure spring 106 also may be described as sprung or loaded configurations. Typically, most flexure springs 106 are planar, generally planar, flat, or generally flat when in the neutral configuration 120. In contrast, when a flexure spring 106 is deformed into a deflected configuration, the flexure spring 106 is no longer planar, or flat, and may form a conical like shape, depending on the construction of the flexure spring 106. However, a flexure spring 106 also may be configured such that the neutral configuration is a non-planar configuration.

Flexure springs 106 may be constructed in a variety of ways. Often, flexure springs 106 comprise a plurality of slots 136 that extend in a spiral pattern at least between the central region 126 and the perimeter region 124, as schematically represented in FIG. 4, although the slots 136 also may extend into the central region 126 and/or the perimeter region 124. As a result, when the central region 126 and the perimeter region 124 are caused to moved relative to each other, such as a result of an imparted force by one or both of the two structures mounted to the flexure spring 106, the slots 136 permit such relative movement, such as seen in the example positions of FIGS. 6 and 7. In particular, the range of deflected configurations 122 serve to define a spring axis 130 of the flexure spring 106. The spring axis 130 may be linear and perpendicular to the plane of the flexure spring 106 when in the neutral configuration 120, such as in the example of FIG. 6, where the perimeter region 124 and the central region 126 have been moved relative to each other in a perpendicular direction relative to the planar state of the neutral configuration 120 in FIGS. 4 and 5. However, the spring axis 130 may be non-perpendicular to the plane of the flexure spring 106 when in the neutral configuration, such as in the example of FIG. 7, where the perimeter region 124 and the central region 126 have translated relative to each other, such as a result of a force or forces acting on one or both of the perimeter region 125 and the central region 126 that are not perpendicular to the planar state of the neutral configuration 120. Additionally, some loads may cause the spring axis to become non-linear, or curved. Accordingly, flexure springs 106 may provide multiple degrees of freedom between the structures mounted to a flexure spring 106, including linear and curved movement along the spring axis 130, as well as pivotal or rotational movement about the spring axis 130.

Figure 8:
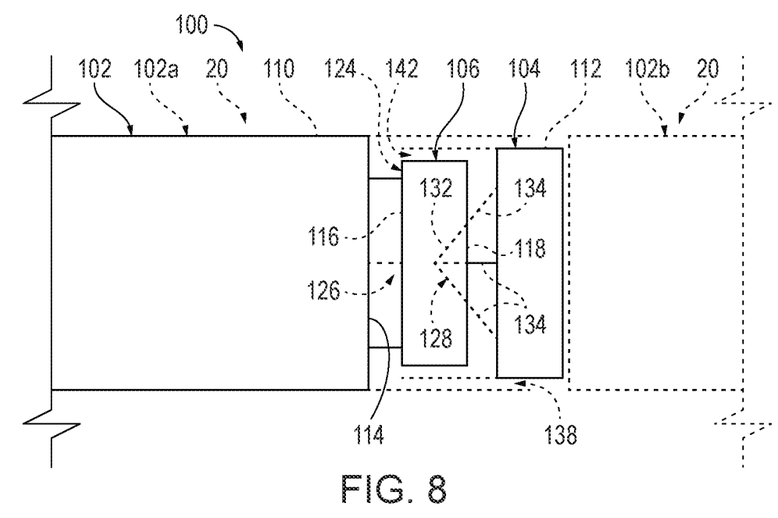
FIG. 8 is a schematic diagram representing aircraft assemblies with a sealing structure.
Figure 9:
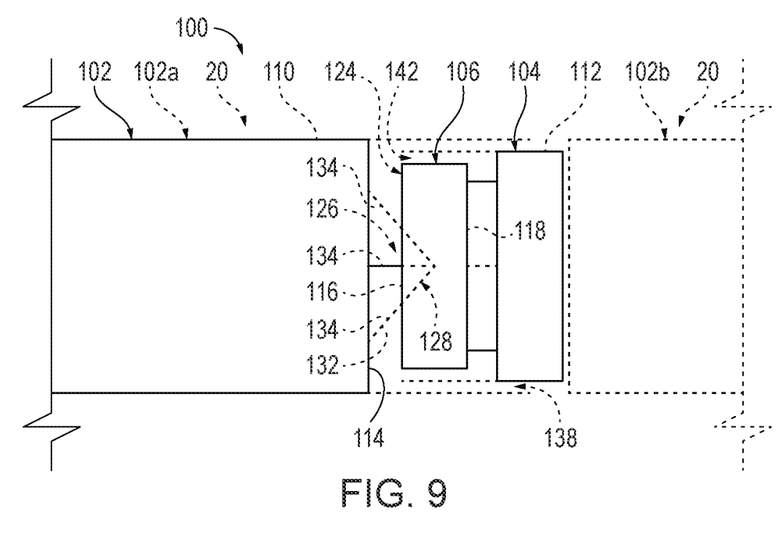
FIG. 9 is another schematic diagram representing aircraft assemblies with a sealing structure.
Figure 10:
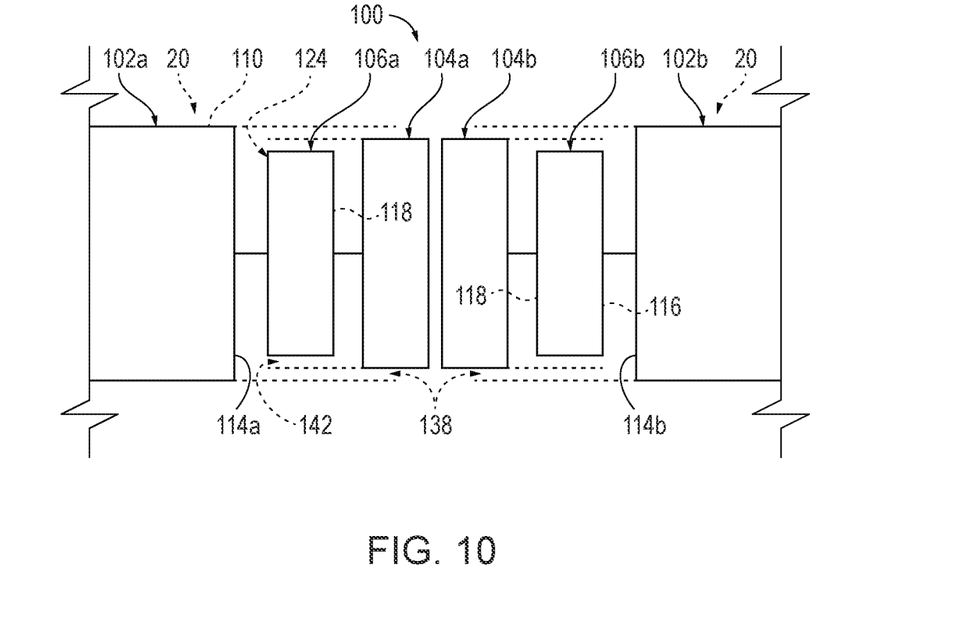
FIG. 10 is a schematic diagram representing aircraft assemblies with two sealing structures.

Turning now to FIGS. 8-10, aircraft assemblies 100 according to the present disclosure are schematically presented. In FIGS. 8-10, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically represented in FIGS. 8-10, aircraft assemblies 100 comprise at least an aerostructure 102, a sealing structure 104, and a flexure spring 106. The aerostructure 102 may be any structure of an aircraft 10, such as a flight control surface 20. The sealing structure 104 is provided to engage with a structure that is adjacent to the aerostructure 102, such as to fill a gap, to ensure a uniform or desired aerodynamic surface between two adjacent aerosurfaces, etc., and the flexure spring 106 urges the sealing structure 104 into such engagement with an adjacent structure. For example, the adjacent structure may be a second flight control surface 20.

The aerostructure 102 comprises an end surface 114. The flexure spring 106 is operably coupled between the aerostructure 102 and the sealing structure 104 and is configured to urge the sealing structure 104 away from the end surface 114 of the aerostructure 102, and thus toward (and into engagement with) an adjacent structure.

In some examples, the aerostructure 102 comprises an aerostructure aerosurface 110, and the sealing structure 104 comprises a sealing-structure aerosurface 112 that is shaped to correspond to the aerostructure aerosurface 110. For example, when the aerostructure 102 is a flight control surface 20, at least a portion of the outer surface of the sealing structure (i.e., the sealing-structure aerosurface 112) may be shaped the same as, similar to, and/or may otherwise correspond to the shape of the flight control surface 20. As a result, the sealing structure 104 may be described as an extension of the aerostructure 102, and the sealing-structure aerosurface 112 may be described as an extension of the aerostructure aerosurface 110. As a result, the combined aerosurface will extend up against the adjacent structure toward which the sealing structure 104 is biased by the flexure spring 106.

As schematically and optionally illustrated in FIGS. 8-10, in some examples, the aerostructure 102 extends at least partially around the sealing-structure aerosurface 112. That is, the aerostructure 102 may define a pocket 138 into which the sealing structure 104 partially extends. As a result, the sealing-structure aerosurface 112 and the aerostructure aerosurface 110 maintain a close proximity to each other even when the sealing structure 104 is biased completely against the adjacent structure.

As also schematically and optionally illustrated in FIGS. 8-10, in some examples, the sealing structure 104 extends at least partially around the flexure spring 106. That is, the sealing structure 104 may define a pocket 142 into which the flexure spring 106 extends.

Turning exclusively to the example aircraft assemblies 100 schematically represented in FIG. 8, in some examples of aircraft assemblies 100, the flexure spring 106 is operably mounted to the aerostructure 102 within the perimeter region 124 of the flexure spring 106 and is operably mounted to the sealing structure 104 within the central region 126 of the flexure spring 106. In such examples, the central region 126 of the flexure spring 106 extends toward the end surface 114 of the aerostructure 102 when the flexure spring is in the range of deflected configurations 122. As a result, the flexure spring 106 biases the central region 126 toward the sealing structure 104 and thus toward the adjacent structure against which it is intended to engage.

In some such examples, the flexure spring 106 is operably mounted to the aerostructure 102 within the perimeter region 124 at three or more spaced-apart positions. For example, with reference back to the example flexure spring 106 of FIG. 4, the flexure spring 106 may have three or more mounts 140, such as holes, that are utilized for operative mounting of the perimeter region 124 to the end surface 114 of the aerostructure 102. In some such examples, the flexure spring 106 is operably mounted to the aerostructure 102 within the perimeter region 124 at exactly three spaced-apart positions. However, other mounting configurations also may be utilized.

In some examples of aircraft assemblies 100, the perimeter region 124 of the flexure spring 106 is at a fixed distance from the end surface 114, and the central region 126 of the flexure spring 106 extends toward the end surface 114 when the flexure spring 106 is in the range of deflected configurations 122. That is, the central region 126 is permitted to move relative to the end surface 114 of the aerostructure 102 against the bias of the flexure spring 106.

With continued reference to the examples of FIG. 8, in some examples of aircraft assemblies 100, the sealing structure 104 comprises a spring engagement structure 128 that engages more of the second side 118 of the flexure spring 106 when the flexure spring 106 is in the range of deflected configurations 122 than when the flexure spring 106 is in the neutral configuration 120. In other words, the spring engagement structure 128 engages the flexure spring 106 outside of the central region 126 at least when the flexure spring 106 in in the range of deflected configurations 122. As a result, it is not merely the central region 126 of the flexure spring 106 that engages and pushes against the sealing structure 104. That is, it is not just the operative mount between the central region 126 and the sealing structure 104 that transfers the flexure spring's bias to the sealing structure 104, effectively spreading the force of the bias over a wide area of the sealing structure 104 via the spring engagement structure 128.

In some such examples, the spring engagement structure 128 comprises an engagement surface 132 that extends at a non-zero angle relative to the spring axis 130 and that engages the second side 118 of the flexure spring 106 at least when the flexure spring 106 is in the range of deflected configurations 122. In some such examples, the engagement surface 132 is conical, dome-shaped, pyramidal, or convex, or otherwise defines a conical, dome-shaped, pyramidal, or convex shape in space. In some examples, the spring engagement structure 128 comprises a plurality of ribs 134 (e.g., at least three) that are spaced radially relative to each other. In some examples, the ribs 134 are spaced radially about the mount between the central region 126 of the flexure spring 106 and the sealing structure 104.

Turning exclusively to the example aircraft assemblies 100 schematically represented in FIG. 9, in other examples of aircraft assemblies 100, the flexure spring 106 is operably mounted to the sealing structure 104 within the perimeter region 124, and the flexure spring 106 is operably mounted to the aerostructure 102 within the central region 126 (i.e., the opposite of the examples of FIG. 8, discussed above). In such examples, the central region 126 of the flexure spring 106 extends away from the end surface 114 of the aerostructure 102 when the flexure spring 106 is in the range of deflected configurations 122. As a result, the flexure spring 106 biases the perimeter region 124 toward the sealing structure 104 and thus toward the adjacent structure against which it is intended to engage.

In some such examples, the flexure spring 106 is operably mounted to the sealing structure 104 within the perimeter region 124 at three or more spaced-apart positions. For example, with reference back to the example flexure spring 106 of FIG. 4, the flexure spring 106 may have three or more mounts 140, such as holes, that are utilized for operative mounting of the perimeter region 124 to the sealing structure 104. In some such examples, the flexure spring 106 is operably mounted to the sealing structure 104 within the perimeter region 124 at exactly three spaced-apart positions. However, other mounting configurations also may be utilized.

In some example of aircraft assemblies 100, the perimeter region 124 is at a fixed distance from the sealing structure 104, wherein the central region 126 extends toward the sealing structure 104 when the flexure spring 106 is in the range of deflected configurations 122. That is, the perimeter region 124 of the flexure spring 106 is permitted to move relative to the end surface 114 of the aerostructure 102 against the bias of the flexure spring 106.

With continued reference to the examples of FIG. 9, in some examples of aircraft assemblies 100, the aerostructure 102 comprises a spring engagement structure 128 that engages more of the first side 116 of the flexure spring 106 when the flexure spring 106 is in the range of deflected configurations 122 than when the flexure spring 106 is in the neutral configuration 120. In other words, the spring engagement structure 128 engages the flexure spring 106 outside of the central region 126 at least when the flexure spring 106 in in the range of deflected configurations 122. As a result, it is not merely the central region 126 of the flexure spring 106 that engages and pushes against the aerostructure 102. That is, it is not just the operative mount between the central region 126 and the end surface 114 that transfers the flexure spring's bias to the sealing structure 104, effectively spreading the force of the bias over a wide area of the aerostructure 102 via the spring engagement structure 128.

In some such examples, the spring engagement structure 128 comprises an engagement surface 132 that extends at a non-zero angle relative to the spring axis 130 and that engages the first side 116 of the flexure spring 106 at least when the flexure spring 106 is in the range of deflected configurations. In some such examples, the engagement surface 132 is conical, dome-shaped, or convex, or otherwise defines a conical, dome-shaped, or convex shape in space. In some examples, the spring engagement structure 128 comprises a plurality of ribs 134 that are spaced radially relative to each other, such as relatively about the mount of the central region 126 of the flexure spring 106 to the end surface 114.

With reference to the examples of both FIGS. 8 and 9, in some examples of aircraft assemblies 100, the aerostructure 102 is a first aerostructure 102*a*, and the aircraft assembly 100 further comprises a second aerostructure 102*b*. In such examples, the flexure spring 106 urges the sealing structure 104 into engagement with the second aerostructure 102*b*. For example, the second aerostructure 102*b* may be a flight control surface 20, and in some such examples, the first aerostructure 102*a* and the second aerostructure 102*b* may be of the same type of flight control surface 20, such as being adjacent slats. For example, when adjacent flight control surfaces 20, such as slats, are deployed in tandem, the aerodynamic forces on the adjacent flight control surfaces 20 can cause them to move at slightly different rates and into slightly different positions. Because the sealing structure 104 is spring biased from one flight control surface 20 toward and into engagement with the adjacent flight control surface 20 by the flexure spring 106, and because the flexure spring 106 allows for non-linear movement of the sealing structure 104 (e.g., see FIG. 7 and discussion above), the corresponding aerosurfaces transition smoothly from one flight control surface 20 to the other.

Turning exclusively to the examples of aircraft assemblies 100 schematically represented in FIG. 10, in some aircraft assemblies 10, the aerostructure 102 is a first aerostructure 102*a*, the sealing structure 104 is a first sealing structure 104*a*, the flexure spring 106 is a first flexure spring 106*a*, and the aircraft assembly 100 further comprises a second aerostructure 102*b*, a second sealing structure 104*b*, and a second flexure spring 106*b* that is operably coupled between the second aerostructure 102*b* and the second sealing structure 104*b*. The second flexure spring 106*b* is configured to urge the second sealing structure 104b away from the second aerostructure 102b, and the first sealing structure 104a is engaged with the second sealing structure 104b. In other words, the two flexure springs urge the two sealing structures into engagement with each other and away from the respective aerostructures. As with the examples of FIGS. 8 and 9, such a configuration results in the corresponding aerosurfaces transitioning smoothly from the first aerostructure 102a to the second aerostructure 102b.

Figure 11:
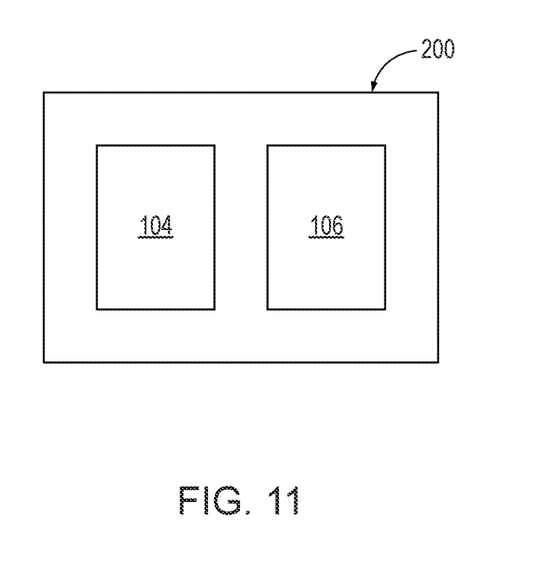
FIG. 11 is a schematic diagram representing aircraft assembly kits.

Turning now to FIG. 11, also within the scope of the present disclosures are aircraft assembly kits 200 that may be used to assemble aircraft assemblies 100 according to the present disclosure. As schematically represented, aircraft assembly kits 200 comprise at least a sealing structure 104, and a flexure spring 106 that is configured to be operably coupled between an aerostructure 102 and the sealing structure 104 to urge the sealing structure 104 away from the aerostructure 102.

Figure 12:
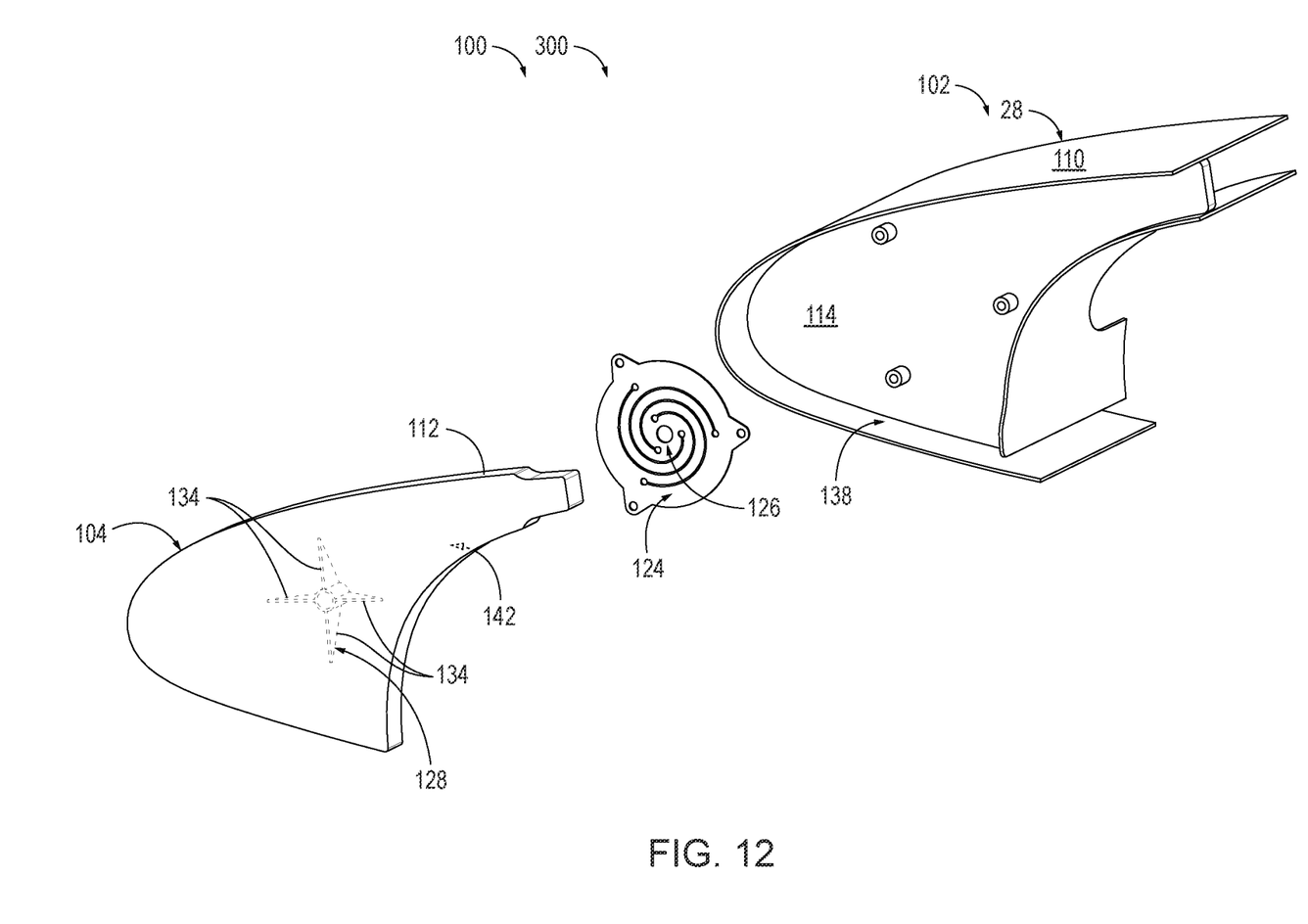
FIG. 12 is an exploded view of an example aircraft assembly with a sealing structure.
Figure 13:
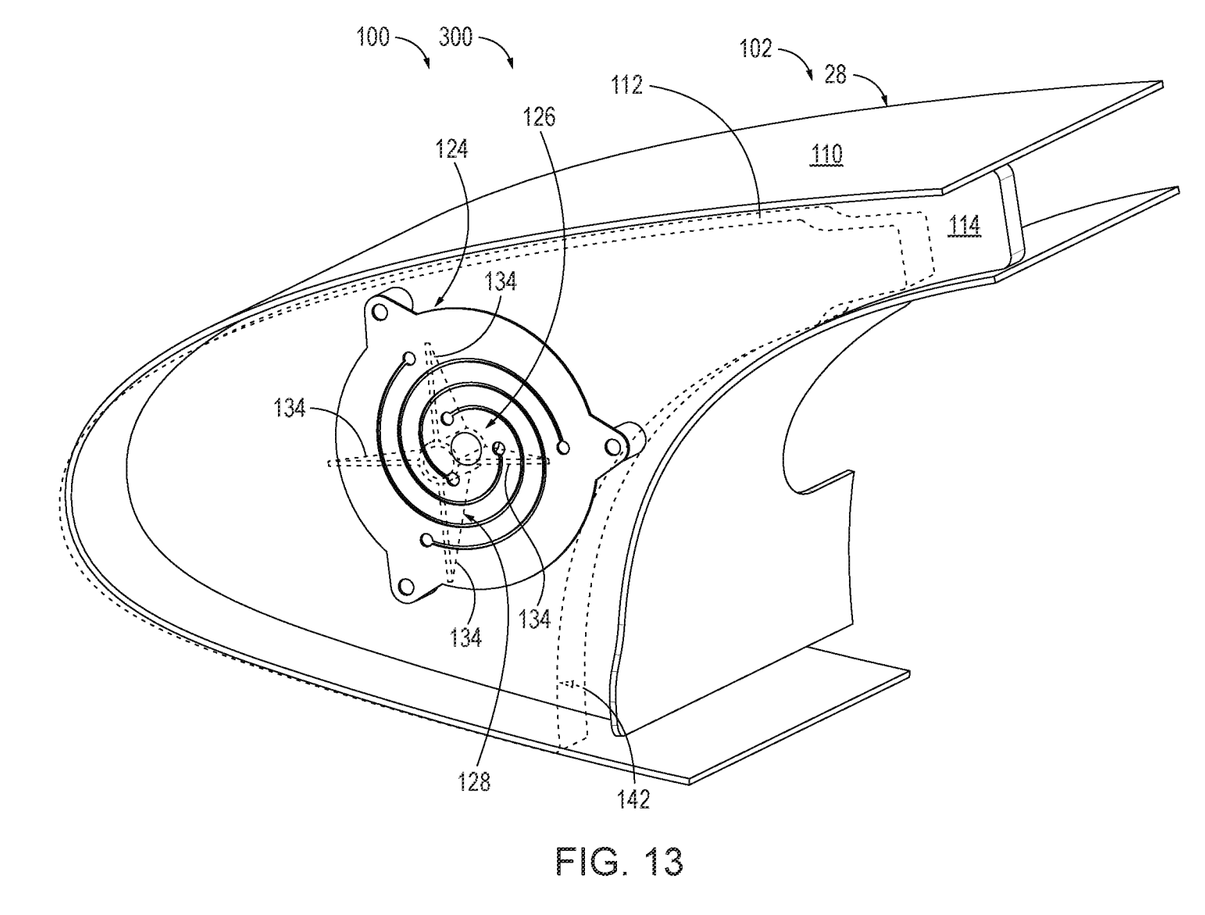
FIG. 13 is an isometric view of the aircraft assembly of FIG. 12, shown with the sealing structure transparent for clarity and with the flexure spring in a neutral configuration.
Figure 14:
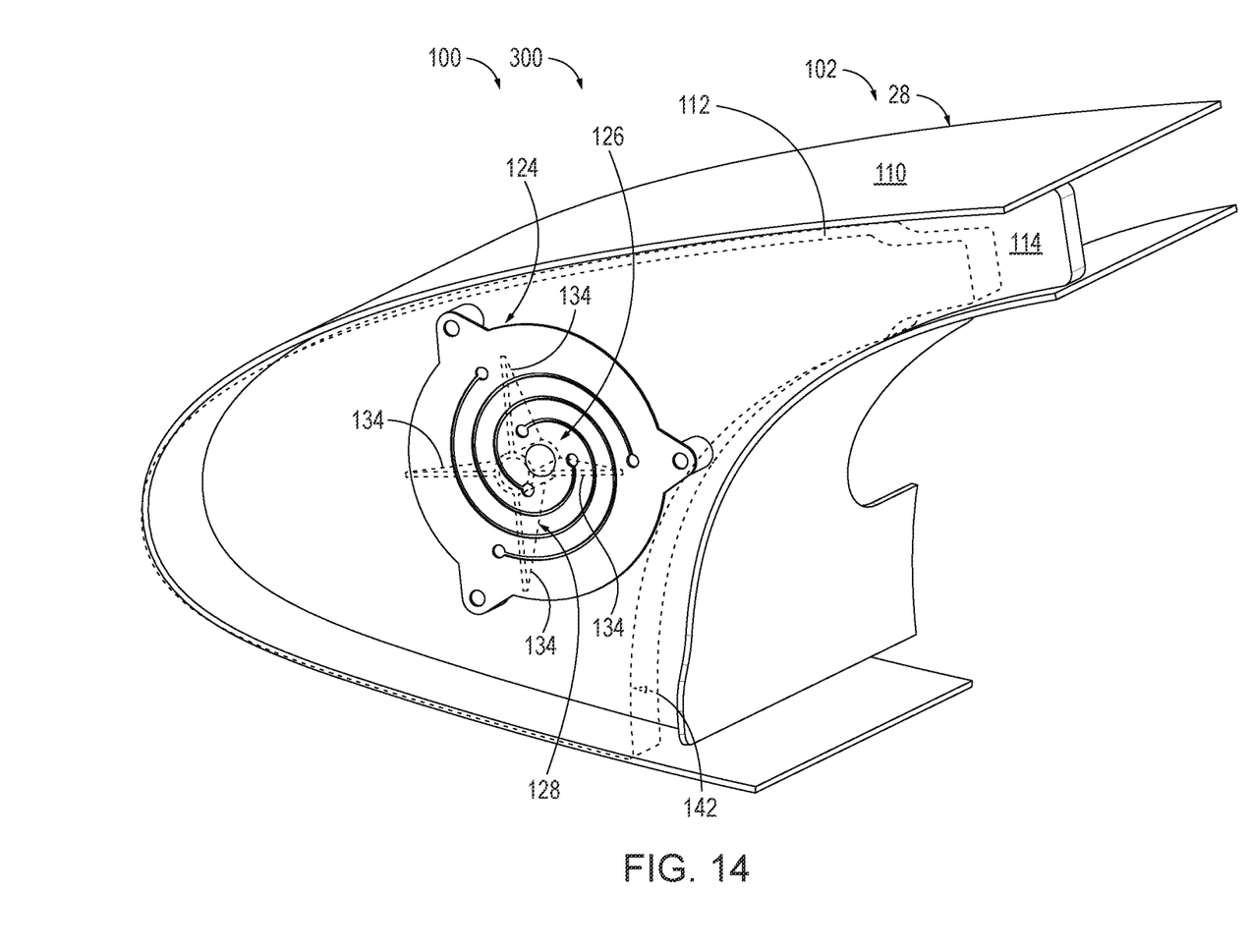
FIG. 14 is an isometric view of the aircraft assembly of FIG. 12, shown with the sealing structure transparent for clarity and with the flexure spring in a deflected configuration.

Turning now to FIGS. 12-14, an illustrative non-exclusive example of an aircraft assembly 100 in the form of aircraft assembly 300 is illustrated. Where appropriate, the reference numerals from the schematic illustrations of FIGS. 8-10 are used to designate corresponding parts of aircraft assembly 300; however, the example of FIGS. 12-14 are non-exclusive and does not limit aircraft assemblies 100 to the illustrated embodiment of aircraft assembly 300. That is, aircraft assemblies 100 are not limited to the specific embodiment of the illustrated aircraft assembly 300 and aircraft assemblies 100 may incorporate any number of the various aspects, configurations, characteristics, properties, etc. of aircraft assemblies 100 that are illustrated in and discussed with reference to the schematic representations of FIGS. 8-10 and/or the embodiment of FIGS. 12-14, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to aircraft assembly 300; however, it is within the scope of the present disclosure that the previously discussed features, variants, etc. may be utilized with aircraft assembly 300.

Aircraft assembly 300 is an example of an aircraft assembly 100 according to the schematic representation of FIG. 8. In this particular example, the aerostructure 102 is a slat 28. As seen, the perimeter region 124 of the flexure spring 106 is mounted to the end surface 114 of the aerostructure 102 at exactly three spaced-apart locations, and the central region 126 of the flexure spring is mounted to the sealing structure 104. The sealing structure 104 of aircraft assembly 300 is an example of a sealing structure 104 that comprises a spring engagement structure 128 that comprises four triangular ribs 134 that are spaced radially about the mount connecting the sealing structure 104 to the central region 126 of the flexure spring 106. The aerostructure 102 of aircraft assembly 300 is an example that defines a pocket 138, into which the sealing structure 104 partially extends. In addition, the sealing structure of aircraft assembly 300 defines a pocket 142, within which the ribs 134 are positioned. The sealing structure 104 comprises a sealing-structure aerosurface 112 that corresponds to the aerostructure aerosurface 110 of the aerostructure 102.

Illustrative, non-exclusive examples of inventive subject matter according to the present disclosure are described in the following enumerated paragraphs:

A1. An aircraft assembly (100), comprising:
an aerostructure (102) comprising an end surface (114);
a sealing structure (104); and
a flexure spring (106) operably coupled between the aerostructure (102) and the sealing structure (104) and configured to urge the sealing structure (104) away from the end surface (114) of the aerostructure (102), wherein the flexure spring (106) has a neutral configuration (120) and a range of deflected configurations (122), wherein the flexure spring (106) is biased toward the neutral configuration (120), and wherein the flexure spring (106) comprises a first side (116) and a second side (118) opposite the first side (116).

A2. The aircraft assembly (100) of paragraph A1, wherein the aerostructure (102) comprises an aerostructure aerosurface (110), and wherein the sealing structure (104) comprises a sealing-structure aerosurface (112) that is shaped to correspond to the aerostructure aerosurface (110).

A2.1. The aircraft assembly (100) of paragraph A2, wherein the aerostructure (102) extends at least partially around the sealing-structure aerosurface (112).

A3. The aircraft assembly (100) of any of paragraphs A1-A2.1, wherein the flexure spring (106) comprises a perimeter region (124) and a central region (126).

A3.1. The aircraft assembly (100) of paragraph A3, wherein the flexure spring (106) is operably mounted to the aerostructure (102) within the perimeter region (124), and wherein the flexure spring (106) is operably mounted to the sealing structure (104) within the central region (126).

A3.1.1. The aircraft assembly (100) of paragraph A3.1, wherein the flexure spring (106) is operably mounted to the aerostructure (102) within the perimeter region (124) at three or more spaced-apart positions.

A3.1.1.1. The aircraft assembly (100) of paragraph A3.1.1, wherein the flexure spring (106) is operably mounted to the aerostructure (102) within the perimeter region (124) at exactly three spaced-apart positions.

A3.1.2. The aircraft assembly (100) of any of paragraphs A3.1-A3.1.1.1, wherein the perimeter region (124) is at a fixed distance from the end surface (114), and wherein the central region (126) extends toward the end surface (114) when the flexure spring (106) is in the range of deflected configurations (122).

A3.2. The aircraft assembly (100) of any of paragraphs A3-A3.1.2, wherein the sealing structure (104) comprises a spring engagement structure (128), and wherein the spring engagement structure (128) engages more of the second side (118) of the flexure spring (106) when the flexure spring (106) is in the range of deflected configurations (122) than when the flexure spring (106) is in the neutral configuration (120).

A3.2.1. The aircraft assembly (100) of paragraph A3.2, wherein the range of deflected configurations (122) defines a spring axis (130) of the flexure spring (106) and wherein the spring engagement structure (128) comprises an engagement surface (132) that extends at a non-zero angle relative to the spring axis (130) and that engages the second side (118) of the flexure spring (106) at least when the flexure spring (106) is in the range of deflected configurations.

A3.2.1.1. The aircraft assembly (100) of paragraph A3.2.1, wherein the engagement surface (132) is conical, dome-shaped, or convex.

A3.2.1.2. The aircraft assembly (100) of any of paragraphs A3.2.1-A3.2.1.1, wherein the spring engagement structure (128) comprises a plurality of ribs (134) spaced radially relative to each other.

A3.3. The aircraft assembly (100) of paragraph A3, wherein the flexure spring (106) is operably mounted to the sealing structure (104) within the perimeter region (124), and wherein the flexure spring (106) is operably mounted to the aerostructure (102) within the central region (126).

A3.3.1. The aircraft assembly (100) of paragraph A3.3, wherein the flexure spring (106) is operably mounted to the sealing structure (104) within the perimeter region (124) at three or more spaced-apart positions.

A3.3.1.1. The aircraft assembly (100) of paragraph A3.1.1, wherein the flexure spring (106) is operably mounted to the sealing structure (104) within the perimeter region (124) at exactly three spaced-apart positions.

A3.3.2. The aircraft assembly (100) of any of paragraphs A3.3-A3.3.1, wherein the perimeter region (124) is at a fixed distance from the sealing structure (104), and wherein the central region (126) extends toward the sealing structure (104) when the flexure spring (106) is in the range of deflected configurations (122).

A3.3.3. The aircraft assembly (100) of any of paragraphs A3.3-A3.3.2, wherein the aerostructure (102) comprises a spring engagement structure (128), and wherein the spring engagement structure (128) engages more of the first side (116) of the flexure spring (106) when the flexure spring (106) is in the range of deflected configurations (122) than when the flexure spring (106) is in the neutral configuration (120).

A3.3.3.1. The aircraft assembly (100) of paragraph A3.3.3, wherein the range of deflected configurations (122) defines a spring axis (130) of the flexure spring (106) and wherein the spring engagement structure (128) comprises an engagement surface (132) that extends at a non-zero angle relative to the spring axis (130) and that engages the first side (116) of the flexure spring (106) at least when the flexure spring (106) is in the range of deflected configurations.

A3.3.3.1.1. The aircraft assembly (100) of paragraph A3.3.3.1, wherein the engagement surface (132) is conical, dome-shaped, or convex.

A3.3.3.1.2. The aircraft assembly (100) of any of paragraphs A3.3.3.1-A3.3.3.1.1, wherein the spring engagement structure (128) comprises a plurality of ribs (134) spaced radially relative to each other.

A4. The aircraft assembly (100) of any of paragraphs A1-A3.3.3.1.2, wherein the aerostructure (102) is a first aerostructure (102a), wherein the aircraft assembly (100) further comprises a second aerostructure (102b), and wherein the flexure spring (106) urges the sealing structure (104) into engagement with the second aerostructure (102b).

A5. The aircraft assembly (100) of any of paragraphs A1-A3.3.3.1.2, wherein the aerostructure (102) is a first aerostructure (102a), the sealing structure (104) is a first sealing structure (104a), and the flexure spring (106) is a first flexure spring (106a), and wherein the aircraft assembly (100) further comprises:
  a second aerostructure (102b);
  a second sealing structure (104b); and
  a second flexure spring (106b) operably coupled between the second aerostructure (102b) and the second sealing structure (104b) and configured to urge the second sealing structure (104b) away from the second aerostructure (102b);
  wherein the first sealing structure (104a) is engaged with the second sealing structure (104b).

A6. The aircraft assembly (100) of any of paragraphs A1-A5, wherein the aerostructure (102) is a flight control surface (20).

A6.1. The aircraft assembly (100) of paragraph A6, wherein the aerostructure is a slat (28).

A6.2. The aircraft assembly (100) of any of paragraphs A6-A6.1 when depending from any of paragraphs A4-A5, wherein the flight control surface (20) is a first flight control surface (20a), and wherein the second aerostructure (108) is a second flight control surface (20b).

A6.2.1. The aircraft assembly (100) of paragraph A6.2 when depending from paragraph A6.1, wherein the slat (28) is a first slat (28a), and wherein the second aerostructure (102b) is a second slat (28b).

B. An aircraft assembly kit (200), comprising:
  a sealing structure (104); and
  a flexure spring (106) configured to be operably coupled between an aerostructure (102) and the sealing structure (104) to urge the sealing structure (104) away from the aerostructure (102).

B1. The aircraft assembly kit (200) of paragraph B, comprising the subject matter of any of paragraphs A1-A6.2.1.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft assembly, comprising:
    an aerostructure comprising an end surface;
    a sealing structure; and
    a flexure spring operably coupled between the aerostructure and the sealing structure and configured to urge the sealing structure away from the end surface of the aerostructure, wherein the flexure spring has a neutral configuration and a range of deflected configurations, wherein the flexure spring is biased toward the neutral configuration, and wherein the flexure spring comprises a first side and a second side opposite the first side.

2. The aircraft assembly of claim 1, wherein the aerostructure comprises an aerostructure aerosurface, and wherein the sealing structure comprises a sealing-structure aerosurface that is shaped to correspond to the aerostructure aerosurface.

3. The aircraft assembly of claim 2, wherein the aerostructure extends at least partially around the sealing-structure aerosurface.

4. The aircraft assembly of claim 1, wherein the flexure spring comprises a perimeter region and a central region.

5. The aircraft assembly of claim 4, wherein the flexure spring is operably mounted to the aerostructure within the perimeter region, and wherein the flexure spring is operably mounted to the sealing structure within the central region.

6. The aircraft assembly of claim 5, wherein the flexure spring is operably mounted to the aerostructure within the perimeter region at three or more spaced-apart positions.

7. The aircraft assembly of claim 6, wherein the flexure spring is operably mounted to the aerostructure within the perimeter region at exactly three spaced-apart positions.

8. The aircraft assembly of claim 5, wherein the perimeter region is at a fixed distance from the end surface, and wherein the central region extends toward the end surface when the flexure spring is in the range of deflected configurations.

9. The aircraft assembly of claim 4, wherein the sealing structure comprises a spring engagement structure, and wherein the spring engagement structure engages more of the second side of the flexure spring when the flexure spring is in the range of deflected configurations than when the flexure spring is in the neutral configuration.

10. The aircraft assembly of claim 9, wherein the range of deflected configurations defines a spring axis of the flexure spring and wherein the spring engagement structure comprises an engagement surface that extends at a non-zero angle relative to the spring axis and that engages the second side of the flexure spring at least when the flexure spring is in the range of deflected configurations.

11. The aircraft assembly of claim 10, wherein the engagement surface is conical, dome-shaped, or convex.

12. The aircraft assembly of claim 10, wherein the spring engagement structure comprises a plurality of ribs spaced radially relative to each other.

13. The aircraft assembly of claim 4, wherein the flexure spring is operably mounted to the sealing structure within the perimeter region, and wherein the flexure spring is operably mounted to the aerostructure within the central region.

14. The aircraft assembly of claim 1, wherein the aerostructure is a first aerostructure, wherein the aircraft assembly further comprises a second aerostructure, and wherein the flexure spring urges the sealing structure into engagement with the second aerostructure.

15. The aircraft assembly of claim 1, wherein the aerostructure is a first aerostructure, the sealing structure is a first sealing structure, and the flexure spring is a first flexure spring, and wherein the aircraft assembly further comprises:
    a second aerostructure;
    a second sealing structure; and
    a second flexure spring operably coupled between the second aerostructure and the second sealing structure and configured to urge the second sealing structure away from the second aerostructure;
    wherein the first sealing structure is engaged with the second sealing structure.

16. The aircraft assembly of claim 1, wherein the aerostructure is a flight control surface.

17. The aircraft assembly of claim 16, wherein the aerostructure is a slat.

18. The aircraft assembly of claim 16, wherein the aerostructure is a first aerostructure and the flight control surface is a first flight control surface, and wherein the aircraft assembly (100) further comprises a second aerostructure, and wherein the second aerostructure is a second flight control surface.

19. The aircraft assembly of claim 18, wherein the first aerostructure is a first slat, and wherein the second aerostructure is a second slat.

20. An aircraft assembly kit for an aerostructure comprising an aerostructure aerosurface, comprising:
    a sealing structure comprising a sealing-structure aerosurface that is shaped to correspond to the aerostructure aerosurface; and
    a flexure spring configured to be operably coupled between the aerostructure and the sealing structure to urge the sealing structure away from the aerostructure.

* * * * *